Patented Sept. 23, 1952

2,611,704

UNITED STATES PATENT OFFICE 2,611,704

DRY MIX

Edward B. Jaeger, Philadelphia, Pa.

No Drawing. Application May 17, 1946,
Serial No. 670,545

13 Claims. (Cl. 99—94)

My invention relates to an improved dry mix for use in baked products such as bread, rolls, biscuits, doughnuts, cakes, pies, sweet goods and other products containing flour, to baking mixes in which such dry mix is incorporated, and to processes relating thereto.

A purpose of my invention is to produce a dry mix which can be incorporated into batter, dough or the like to enhance greatly the characteristics of lightness, moisture, moisture retention, freshness, grain texture, resilience, and large volume desired for the particular baked product being produced.

A further purpose is to produce a dry mix containing a shortening agent of greatly increased potency, so that the quantity of shortening and especially the quantity of fat can be reduced markedly without impairing, and in fact with improvement in, the quality of the baked product.

A further purpose in a dry mix for leavened baked flour products is to reduce the quality of shortening fat to less than 20% of that previously required, especially in cakes containing more sugar than flour, while obtaining a baked product with more volume, more retained moisture and improved eating qualities with respect to light, tender texture and soft resilient body structure.

A further purpose is to introduce into the baking mix a major part and preferably all of the shortening in a dry mix in a form which will not convert to oil at about the temperature of boiling water as has been the case in prior art shortenings.

A further purpose is to minimize the extent of oil soaking of the gas cell walls by the shortening during the baking by retarding the conversion of the shortening into oily material at and below the baking temperature.

A further purpose is to stabilize the moisture or water content of a dough or batter made from a dry mix so that it is retained not only during the preparation and leavening of the baking mix but also to a markedly greater degree during the baking operation, with resulting improvement in the palatability and retention of freshness by the baked product.

A further purpose is to make possible the incorporation of up to 7½% more water in the baking mix made from a dry mix than has previously been possible in so-called "well-balanced" formulas for batters and doughs.

A further purpose is to improve the retention of air, gas and moisture vapor generated by the leavening agent and produced during the mixing of a dry mix with watery liquid and baking, by improving the gas and moisture retention properties of the shortening agent used in the dry mix, so that the shortening agent containing the fat and especially one containing a triglyceride fat will retain a proper amount of air during the mixing process and so that the gas and moisture vapors are to a greater extent retained in the dough or batter during the baking process until the walls of the gas cells or bubbles are sufficiently strengthened to hold their form without the support of gas pressure, thus producing a product of enhanced lightness, texture, volume and palatability.

A further purpose is to help inhibit or retard mold growth on a dry mix and also in the baked product produced therefrom.

A further purpose is to eliminate or greatly reduce the hazard to the baker through occasional batches which turn out to be dry, rough and crumbly after baking.

A further purpose is to avoid the necessity of using relatively high cost shortening agents, such as superglycerinated fats, especially in cakes containing more sugar than flour, and permit the use of less expensive fats such as triglyceride fat and more diversified types of fat.

A further purpose is to produce a dry mix for baked flour products, comprising flour, an ester or ether of edible fatty acid with a compound of the class consisting of edible polyhydric alcohols and corresponding ethers, said ester or ether having at least one unreacted hydroxyl group and being solid or semi-solid at about 25° C., in combination with a humectant such as glycerine, and desirably also with a fat, preferably hydrogenated, an emulsifying agent, and a mold inhibitor.

A further purpose is to produce a dry mix for baked flour products, comprising from 25 to 90% of flour, most desirably from 30 to 85%, 0.3 to 3% of an ester or ether of an edible fatty acid with a compound of the class consisting of edible polyhydric alcohols and corresponding ethers, said ester or ether having at least one unreacted hydroxyl group and being solid or semi-solid at about 25° C., in combination with from 0.015 to 8% of a humectant such as glycerine, and desirably also with from 0.5 to 6% of a fat, from 0.001 to 0.2% of an emulsifying agent, preferably an acid emulsifying agent of a mucilaginous character, and from 0.001 to 0.1% of a mold inhibitor.

A further purpose is to produce a cake batter containing sugar in excess of flour, by means of a dry mix comprising flour, an ester or ether of an edible fatty acid with a compound of the class consisting of edible polyhydric alcohols and corresponding ethers, having at least one unreacted hydroxyl group, said ester or ether being solid or semi-solid at about 25° C., and preferably also in combination with a humectant, a fat, preferably a hydrogenated triglyceride fat, and an emulsifying agent.

A further purpose is to produce a dry mix for baked flour products and desirably also a batter or dough, comprising in the dry mix, flour, an ester or ether of an edible fatty acid with glycerol, having at least one unreacted hydroxyl group, and an ester or ether of an edible fatty acid with propylene glycol, having at least one unreacted hydroxyl group, desirably in combination with a humectant, a fat and an emulsifying agent.

A further purpose is to produce a dry mix for baked flour products comprising flour, an ester or ether of an edible fatty acid with a compound of the class consisting of edible polyhydric alcohols and corresponding ethers, having at least one unreacted hydroxyl group, said ester or ether being solid or semi-solid at about 25° C., in combination with an acid emulsifying agent, preferably of a mucilaginous character and desirably also a humectant such as glycerine and a fat.

A further purpose is to produce a dry mix for baked flour products comprising flour, an ester or ether of an edible fatty acid with a compound of the class consisting of edible polyhydric alcohols and corresponding ethers, having at least one unreacted hydroxyl group, said ester or ether being solid or semisolid at about 25° C., in combination with an edible mold inhibitor such as gum guaiac and desirably also a humectant, a fat and an emulsifying agent preferably of acid character.

A further purpose is to employ in the dry mix two types of emulsifying agents, one of which is an acid emulsifying agent of the mucilaginous or gelatinous type such as algin, gelatine, or the like which aids in holding air or gas in the baking mix and thereby increases the volume of the baked product, and the other of which is of the character which reduces the interfacial tension between the oil and the water phases such as lecithin or a water soluble soap, and thus increases the emulsion stability.

A further purpose is to render it possible to hold gas and air used for leavening more effectively in a dry mix in which the fat is preponderantly triglyceride fat, particularly lard.

A further purpose is to produce a dry mix for baked flour products and particularly for such products as contain more sugar than flour, for example yellow cakes, white cakes, and pound cakes, all of which require the entrapment of air during the batter-mixing process and a retarding action on the escape of moisture vapors and gas during the baking process, in which the desired shortening fat is triglyceride, such as lard, lard compounds, hydrogenated vegetable oils and the like and which shortening agent creates the phenomenon that such fats are enabled to sustain the air introduced during the mixing process of the batter and to further retard the escape of moisture vapors and gas created during the baking process, all of which as stated is essential to the baking of acceptable baked products of the classes described.

A further purpose is to produce a baked product of improved digestibility from triglyceride fat by incorporating into the dry mix an acid emulsifying agent, preferably of the mucilaginous type, along with the triglyceride fat, preferably as part of the shortening agent with the stabilizer and humectant.

A further purpose is to produce a pie crust dry mix containing flour and a shortening mix comprising a stabilizer in combination with an emulsifying agent and desirably a fat, with or without a humectant.

A further purpose is to produce a baking mix for a baked flour product, by mixing a stabilizer with a humectant and desirably also with an emulsifying agent and a fat to form a shortening mix, incorporating the shortening mix with dry ingredients including flour, dried eggs, and/or dried milk to form a dry mix, and mixing with the dry mix watery liquid attributable to the shortening mix and also watery liquid attributable to the dried eggs and/or dried milk.

A further purpose is to limit the quantity of shortening mix of the character described to less than 20% of the baking mix, preferably from 3 to 17% of the dry mix.

A further purpose is to employ a shortening mix based upon an ester or ether of the type described, in a quantity of shortening mix, limited to from 4 to 12% of the baking mix, and with a total content of fat (such as superglycerinated hydrogenated vegetable oil fat) plus stabilizer limited to 9% of the dry mix.

Further purposes appear in the specification and in the claims.

In the present invention, numerous formulae are possible, and no attempt will be made to list in the examples all possible mixtures or proportions either of the dry mix or of the baking mix in which the shortening mix will be incorporated.

To clarify the description, it should be understood that the premix including shortening ingredients is designated herein as a shortening mix. It may be sold as a separate product, in which case it will be analogous to a shortening agent as described and claimed in my U. S. patent application, Serial No. 666,806, filed May 2, 1946, now abandoned, for Shortening, Baking Product and Process, or it may be incorporated with dry ingredients immediately after manufacture and without separate sale. It will normally differ from the shortening agent of my copending application above referred to because it will be substantially free from watery liquid, whereas the shortening agent will commonly include watery liquid.

The mixture of shortening mix and flour or other dry ingredients such as sugar, dried eggs, dried milk, yeast, baking powder, salt and the like, but not including substantial quantities of watery liquid, I designate a dry mix. It normally will be sold as such and when mixed with watery liquid to compensate for the requirements of the shortening mix, the dried eggs, dried milk and the like, it will constitute a baking mix from which the final cake, bread or other baked product will be obtained.

It will be appreciated that certain features of the invention can be accomplished by adding part or all of certain ingredients to the baking mix separately rather than incorporating them in the dry mix, and further, part or all of certain ingredients otherwise incorporated directly in the baking mix can be utilized by adding them to the dry mix, and no attempt is being made to indicate all possible variations of this character.

For example a material which would normally be used in the dry mix, such as yeast, may in some cases be left out of the dry mix and added, instead, in the baking mix. Other examples of variations will appear at later points in the specification and in the claims.

In the prior art, shortening agents have commonly been employed which are oleaginous in character, and every attempt was made to exclude from the dry mixes materials which are hygroscopic in character, as it was considered that such materials were deleterious. Contrary to this prior practice, the dry mix of the present invention is in its best form a carrier of a humectant which will aid in holding water during the baking and shelf life of the baked product.

It is the purpose of this invention to create a shortening mix to take the place of prior art shortenings in what is known to the trade as a dry mix.

A very valuable ingredient of the shortening mix to enable the production of a higher quality product than that attained by prior art shortenings is a watery liquid. But in as much as watery liquids are deleterious to a dry mix, such a material cannot be incorporated in either the shortening mix or the dry mix. It must therefore be incorporated during the process in "making up" the baking mix. To differentiate between such water and the water required to reconstitute the powdered milk and powdered eggs in the baking mix, I have shown the water itemized to its particular field.

Efforts have been made in the prior art to utilize triglyceride fat, plain or hydrogenated, or mixtures of such fats, in cakes containing more sugar than flour, in so-called pound cakes which derive their leavening action from air in preference to yeast or chemical leavening agents, and in white cakes containing the whites of eggs in preference to the whole eggs, and all such efforts resulted in a failure of the baked product, for the simple reason that all such triglyceride fats are not only antagonistic to watery liquids but particularly because they are antagonistic to air, moisture vapors and gas.

I have found that the dry mix of this invention, when properly compounded, makes possible the use of triglyceride fats, plain or hydrogenated or mixtures of such fats in all of such above mentioned products. This is by reason of the fact that certain of the ingredients used to form the dry mix are of such a nature as to reverse the adversity of triglyceride fat for air, moisture vapors, gas and watery liquids and so enable such fats to hold large quantities of these ingredients and become more potent than any other type of known fat such as, for example, superglycerinated shortening, triglyceride fat alone, and the like, when used in the above mentioned products, resulting in a baked product which is more tender, of larger volume, more moist, of longer shelf life and with a better grain and texture, than a product similar but containing prior art shortening.

I have discovered that by proper compounding, shortenings of much greater potency than triglyceride fat, hydrogenated fat and superglycerinated fat may be produced, so that baked products of equal or even superior quality to those obtained in the prior art may be secured even in cakes containing more sugar than flour, with a great economy in shortening ingredients. It is also possible to render the products more digestible. Adequate shortening can be obtained according to my invention using as little as 0.5 to 3.5% of plain lard by weight in a high sugar content cake batter. The stabilizer plus fat need not exceed 6% of the batter. The resulting cake has larger volume, more retained moisture, longer shelf life and a more tender, velvety and resilient texture than those made with prior art shortenings. The same may be applied in doughs, batters and the like using less sugar than flour or an equal quantity of sugar to flour.

I find that the quantity of shortening fat may be cut as low as 20% of prior art practice with resulting saving at all stages, and without impairing the quality. Example 5 below shows the use of small amounts of fat in the shortening mix, Example 5a shows the application of this shortening mix to dry mixes, and Example 5b shows the effect when applied to a baking mix.

The revolutionary character of this feature of the invention will be indicated by Examples 6 to 6b described below, in which the total content of lard plus stabilizer (to be described below) is only 2.4% by weight of the batter, with only 2.0% of lard. The entire amount of my novel shortening mix which is used in this cake is 5.2%, and 2.2% or almost half is a watery liquid. That such a formula could produce an edible or even salable cake is unbelievable from the knowledge of the prior art. This product is the more remarkable because it possesses greater volume with a lighter, more tender texture than the best similar product made with superglycerinated shortening in any desired percentage.

I have also discovered that it is not only unnecessary as above set forth to use superglycerinated fat as shortening, but I have found that such fat as is commonly used actually induces shrinkage of the baked product to such an extent that it produces a product of higher density and other less desirable characteristics than that produced in accordance with the present invention, for example one with more volume and moisture and longer shelf life, all of which are much sought after in the art.

I have also found that glycerol monostearate tends to produce in a high sugar content cake higher density than propylene glycol monostearate.

In prior art shortenings, and especially superglycerinated shortenings used in high sugar content cakes (cake containing more sugar than flour), I find that there is a marked tendency for the shortening to convert to oil during baking, soaking the walls of the gas cells and preventing them from adequately supporting the cake prior to the time when the leavening agent has ceased to generate gas. The dry mix of the present invention is especially calculated to prevent conversion of the fat to oil during the early stages of baking. In fact it is possible to subject the dry mix of the invention to the temperature of boiling water without causing substantial oil separation. This is not because of higher melting point of the fat, but because the fat when mixed with watery liquid is more effectively held in a disperse phase. Since in these prior art cakes the side walls of the cells of the baked product are not sufficiently strong to sustain themselves when the leavening agent completes its action, the cake cannot avoid shrinkage, and the resulting product is more dense than a product similar but containing the dry mix of this invention.

I do not base my invention, however, on this theoretical explanation. In prior art dry mixes and shortenings and prior art baked flour products it has not been found possible to use triglyceride fat as shortening in so-called pound cakes, white cakes or cakes containing more sugar than flour, for reasons explained above. The dry mix of this invention, however, is specially calculated to make possible the use of triglyceride fat in all such baked products, by overcoming the antagonistic action of such fats to air, moisture vapors and gas, and causing them to have an affinity for them, thus creating a process and a material that is new in the art of baking.

The dry mix of the present invention will contain all or a suitable quantity of the flour to go in the baking mix to be made from the dry mix, along with other suitable dry ingredients of the baking mix such as salt or sugar. The flour will of course be of any suitable type, blended or unblended, and it may be cake flour, bread flour, etc.

I have also discovered that the dry mix of the present invention has an improved tendency to retain moisture not only during baking but during the shelf life of the cake, causing the cake to retain its resilience and its velvety, soft texture for a longer period. In accordance with the invention, a stabilizer is employed which consists of an ester or ether of an edible fatty acid with a compound of the class consisting of edible polyhydric alcohols and corresponding ethers, the ester or ether having at least one unreacted hydroxyl group, and being solid or semisolid at about 25° C. The stabilizer is an important element of the dry mix. The esters or ethers may be mono-esters or ethers of a dihydric alcohol such as propylene glycol, or mono-, or di-esters or ethers of a trihydric alcohol such as glycerol or mono-, di-, or higher esters of higher alcohols, but in any case they will contain at least one unreacted hydroxyl group.

For making the ester, edible fatty acids will be used. The ethers will be made from any suitable edible compounds of corresponding alkyl grouping.

The fatty acids most suitable are stearic or palmitic, but other suitable fatty acids such as melissic may be used where they form edible esters or ethers which are solid or semisolid at about 25° C. Fatty acids from suitable animal or vegetable fats may be used if desired. In the preferred embodiment, these materials will have carbon chains of from 15 to 35 carbon atoms, preferably from 15 to 18.

The edible polyhydric alcohols include edible glycols such as propylene glycol, glycerol, polyglycerols, such as di-, tri- and tetra-glycerol, as well as sorbitol, mannitol and pentaerythritol. Ethylene glycol, diethylene glycol, or triethylene glycol, may be used if polymerized to a molecular weight in excess of 500 (Bennett U. S. Patent 2,275,494) to render them nontoxic. The same polymerization may be applied to glycerol, pentaerythritol, sorbitol and mannitol before reacting to form the stabilizer.

I intend the edible polyhydric alcohols to include the edible polyhydroxy compounds generally.

The edible polyhydric alcohols also form ethers or anhydropolyhydric alcohols corresponding to the alcohols and these in turn form esters or ethers with the fatty acids above referred to. Examples of such ethers are the sorbitans, sorbides, mannitans and mannides which are anhydromannitols and anhydrosorbitols varying in the point of dehydration. 1-5-mannitan is one specific example and the various other mannitans, etc. are equally suitable.

The quantity of ester or ether stabilizer may vary widely, but it will advantageously be between 0.3 and 3% inclusive of the weight of the dry mix. In terms of the baking mix it will advantageously be from 0.2 to 2.5% by weight.

In order to get this result, the shortening mix will advantageously contain from 5 to 60% of stabilizer. The preferable range is from 9 to 50%, and the most desirable range is from 10 to 35%. These latter ranges correspond to from 0.45 to 2.5% of the dry mix and from 0.5 to 1.8% of the dry mix.

The preferred form of stabilizer ester is propylene glycol monostearate. Other materials which are quite desirable are propylene glycol monopalmitate, polymerized diethylene glycol monostearate, polymerized diethylene glycol monopalmitate, glycerol monostearate, glycerol monopalmitate, glycerol distearate, glycerol dipalmitate, glycerol monostearate monopalmitate, sorbitan monostearate, sorbitan monopalmitate, sorbitan distearate, sorbitan dipalmitate, sorbitan monostearate monopalmitate, mannitol monostearate, mannitol monopalmitate, diglycerol monopalmitate, triglycerol distearate, monomelissyl polymerized diethylene glycol, monopalmityl polymerized diethylene glycol, monostearyl polymerized diethylene glycol, monostearyl polymerized triethylene glycol, etc. While these esters themselves are not fats, they have marked effect in holding the other ingredients of the shortening agent in an emulsion phase, and assist the emulsifying agent in retaining the emulsion condition even at elevated temperatures. When combined with an emulsifying agent they have the quality of imbibing large amounts of watery liquids; and a further quality of retarding the natural evaporation otherwise occurring to these liquids; and a further quality of trapping and holding large amounts of air in the emulsion during the mixing process of the cake batter, for example, when incorporated in such batter in emulsion form; and of overcoming the tendency of triglyceride fat to be antagonistic to air, moisture vapors and gas during the mixing and baking process, producing an affinity for such, thereby making it possible to use triglyceride fats in high sugar content cakes, pound cakes and white cakes.

The preferred form of stabilizer ether is palmityl mono-ether of glycerol or stearyl mono-ether of glycerol. Other examples are palmityl mono-ether of di-glycerol, stearyl mono-ether of propylene glycol, di-palmityl diglycerol ether, distearyl diglycerol ether, etc.

All of the compounds have at least one unreacted hydroxyl group.

The stabilizer may be described as a stabilizer of the class consisting of esters and corresponding ethers of an edible fatty acid with a compound of the class consisting of edible polyhydric alcohols and corresponding ethers, said stabilizer having at least one unreacted hydroxyl group and being at least semi-solid at about 25° C. It will be noted that ethers are mentioned twice. This is done because the ether linkage may either join the alkyl group corresponding to the fatty acid to the polyhydric alcohol, as in palmityl mono-ether of glycerol, or the ether may be present in the polyhydric alcohol, as in mannitan, or it may be in both places. When it is stated that the stabilizer is at least semi-solid, it is meant that it will be semi-solid or solid. By semi-solid it is meant that the mass will not pour.

In addition to the stabilizer, a humectant will very desirably be used to ensure a soft, velvety, resilient texture, to assist in retaining moisture in the shortening agent during baking, and to retain the moisture in the baked product during shelf exposure. The preferred humectant is glycerine, but other suitable humectants are levulose, of which one variety is marketed as apple syrup, sorbitol solution (70 to 100% sorbitol, preferably 83% by weight), and mannitol solution (suitably of similar concentration). It will be evident of course that the glycerine or other humectant to be effective should be present as a free or uncombined material, glycerine combined as an ester being, of course, ineffective for this purpose.

The humectant will desirably be present as from 0.015 to 8% of the dry mix, or from 0.01 to 5% of the baking mix. In the shortening mix the humectant will advantageously comprise from 1 to 60%, preferably from 5 to 40% and most desirably from 10 to 25%. In terms of dry mix, it is preferable to use from 0.25 to 2%, and most desirable to use from 0.5 to 1.2%.

I will also very desirably incorporate with the stabilizer a fat. The stabilizer, of course, is not a fat. In some instances, the fat may be incorporated in the batter or dough rather than put in the dry mix, and in some cases the fat may be omitted. However, in the best embodiment of the invention, the fat content will be large compared to the stabilizer content but comparatively small compared to the fat in prior art shortenings. One of the great advantages of the present invention is that it makes possible the use of common shortening such as lard, lard compounds and various triglyceride fats (with or without hydrogenation) in cakes containing more sugar than flour. It will, however, be understood that superglycerinated fat, hydrogenated fat, butter and other natural and synthetic fats may be incorporated in the shortening mix in the amount specified for fats.

To protect against rancidity in the dry mix, it is desirable to use hydrogenated fat such as hydrogenated lard.

Since the stabilizer frequently lacks softness and pliability and tends to be of wax-like character, the fat may be used for its plasticizing action on such stabilizer by first conditioning the stabilizer by means of heat to its molten state so that it will receive such fat and become when cool, a plastic paste-like homogeneous product.

In the prior art the amount of shortening required in dry mixes was the total of the shortening required in the corresponding formula for the bakery products. For example in layer cakes containing more sugar than flour the amount of shortening heretofore required was 10 to 14% or more of the weight of the batter. Accordingly in the prior art dry mixes, from 14 to 20% or more of shortening was used to produce a formula of this character in order to have a shortening content in the cake batter of 10 to 14% or more. The inclusion of from 14 to 20% of shortening fat on the weight of the dry mix imposed a burden not only from the standpoint of carrying this fat with the other ingredients, but also from the standpoint of obtaining a homogeneous dry mixture initially. In accordance with the present invention the fat content necessary in the dry mix need range only from about 2 to 8%, and the total of fat plus stabilizer will not ordinarily exceed 9%.

An important feature of the invention is that only from 0.5 to 6% of triglyceride fat such as lard based on the dry mix need be used to produce high quality baked products. The preferable range is from 2 to 5%, and the most desirable range from 2.5 to 4%.

Of the baking mix, the fat will advantageously be from 0.5 to 4%.

The shortening mix will advantageously contain from 20 to 80% of fat, preferably from 25 to 75%, and most desirably from 30 to 65%.

It is also desirable to incorporate in the dry mix an emulsifying agent, which will act in the cold and preferably of acid character. The stabilizer itself has no tendency to unite homogeneously with watery liquid, and while it is possible especially with heat to produce temporary dispersion, such stabilizers unaided do not form smooth, stable emulsions.

The emulsifying agent will preferably be of acid character, although neutral and in some cases even basic emulsifying agents may be used. The acid emulsifying agents such as gelatine, Irish moss, pectin, algin, locust bean gum and gum tragacanth act in the cold to produce a gelatinous or mucilaginous mass in the baking mix which retains high viscosity notwithstanding the presence of a large amount of water.

This gelatinous character has been found to be very desirable in retaining the fatty material of the dry mix in dispersion during the baking operation, and especially in retaining air and gas in the mix.

Lecithin is a very desirable acid emulsifying agent, but it acts by reducing the facial and interfacial tension between the oil and watery phases, rather than by increasing the viscosity of the water phase.

Lecithin is an effective emulsifying agent for the dry mix both in high sugar content cakes and in other baked products. Emulsifying agents of the adhesive-cohesive type may be used to advantage with lecithin.

In some cases egg material may serve as an emulsifier although it is of inferior quality.

It should be understood, however, that any dry edible material, capable of raising the viscosity of watery liquids when added cold, sufficient to enable their emulsification with the stabilizer or fat of this invention, may be used as the emulsifying agent, and it should be understood that any other type of edible emulsifying agents whether alkaline or acid in reaction may be used and that an alkaline agent or an agent having a similar reaction to an alkaline agent may be used in combination with an acid emulsifying agent which is capable of thickening watery liquids and that combinations of various types of emulsifying agent may be used.

While, as above indicated, the emulsifying agent will desirably be non-alkaline, small amounts of water-soluble soap, which may be alkaline, may less desirably be included. Soap also emulsifies by reducing the facial and interfacial tension between the water and oil phase. Where soap is used it preferably should not exceed 0.04% of the shortening mix, although in some cases up to 3% may be employed. I have discovered through extensive experiments that, while soap or other alkaline emulsifying agent is detrimental to the volume of the cake, especially in high sugar content cakes, it is of value in some cases in dough formulas as a dispersing agent, to aid in the dispersion of the shortening phase throughout the watery phase of the dough formula and in this manner create a better distribution of the dry mix throughout the baking mix. In general alkaline emulsifying agents do not offer the advantage peculiar to acid emulsifying agents of the mucilaginous type of assisting in holding air and gas in the batter or dough during the baking.

Emulsifying agents of the oil soluble type, such as glycerol ricinoleate, propylene glycol monolaurate, sorbide mono-oleate, and sorbide monolaurate, when available in forms which are edible (substantially free from taste) may be used in the shortening agent.

It will be possible to use either oil-in-water or water-in-oil dispersion systems. Where oil-in-water dispersion is desired, or where the shortening agent is to be dispersed in or emulsified in a large amount of water, as for example in the water phase of a dough mix, it is preferred to use an emulsifying agent which functions by lowering the interfacial tension of the fatty material and aqueous ingredient or to use a combination of such emulsifier with one of the mucilaginous type. Among the agents that can be used for this purpose are lecithin and soap, propylene glycol monolaurate, sorbitan monolaurate and glyceryl ricinoleate. The laurate or ricinoleate should however be as nearly tasteless as possible.

In the prior art, in high sugar content cakes, where superglycerinated hydrogenated vegetable oil shortenings are used exclusively, there was thought to be no need of an adhesive-cohesive emulsifying agent. I have discovered that such an emulsifying agent in the dry mix is particularly valuable in cakes of this type.

While in the prior art, use has been made of emulsifying agents such as algins in icings, fillings and the like for pastry, there has been no previous recognition of the fact that such agents of the adhesive-cohesive type (mucilaginous or gelatinous) should form part of a dry mix.

My experiments indicate that emulsifying agents, especially of the mucilaginous type, not only assist in incorporating the flour, stabilizer, fat and other ingredients of the dry mix into a stable emulsion, but also help to control the moisture and air during the mixing and baking process in the baked product and, by so doing promote resiliency and tend to produce a more tender, lighter texture and a more smooth velvety grain.

Other things being equal, the higher the viscosity of a solution, the lower its rate of evaporation, and the greater its power to trap and hold air during the mixing. Lard and other types of commercially available triglyceride shortenings as such have little or no tendency to retain air and gas. Such fats and superglycerinated shortenings readily revert to oil during baking, making little, if any, contribution toward retaining moisture. The watery liquid itself is of course relatively ineffective in retaining air and gas. This condition is believed to be the cause of the relatively high shrinkage in prior art baked products.

By use of an acid emulsifying agent of the mucilaginous or gelatinous type, I am readily able to obtain a solution of high viscosity which has limited tendency to lose water by evaporation, while at the same time by its emulsifying action, which remains effective at relatively elevated temperature, the fatty materials are held in a dispersed phase and prevented from flowing together as oil, while the mucilaginous character of the emulsifying agent cooperating with the stabilizer strengthens the walls of the gas cells and tends to reduce the loss of air and gas during baking, thus reducing shrinkage.

The following table lists various suitable emulsifying agents, with suggested proportions with respect to the watery liquid. It will be understood of course that these ratios are not intended as limitations but are merely included by way of example. The ratio of emulsifying agent to water in the baking mix can of course be varied from a low limit at which it will just carry the dispersion to a high point at which additions of emulsifying agent are not longer useful. The permissible variation is indicated by the fact that using a gum such as algin, with 535 parts of fat, 90 parts of stabilizer, and 875 parts of water added in the baking mix, one part of gum is sufficient to produce an emulsion, but a superior product is obtained using 6 parts of gum.

| Emulsifying agents | Ratio to watery liquid |
|---|---|
| Algin | 1 gm. to 85 cc. |
| Gum tragacanth | 1 gm. to 328 cc. |
| Locust bean gum | 1 gm. to 85 cc. |
| Irish Moss | 1 gm. to 85 cc. |
| Gelatine | 1 gm. to 35 cc. |
| Pectin | 1 gm. to 15 cc. |
| Lecithin | 1 gm. to 75 cc. |
| Gum Arabic (not compatible with gum guaiac) | 1 gm. to 45 cc. |
| Glyceryl Monolaurate | 1 gm. to 45 cc. |
| Propylene Glycol Monolaurate | 1 gm. to 45 cc. |
| Mannitan Monolaurate | 1 gm. to 45 cc. |
| Glyceryl Ricinoleate | 1 gm. to 45 cc. |
| Sorbitan Monolaurate | 1 gm. to 45 cc. |
| Potassium Stearate | 1 gm. to 4,500 cc. |
| Sodium Stearate | 1 gm. to 4,500 cc. |
| Sodium Oleate | 1 gm. to 4,500 cc. |

The proportion of emulsifying agent may range from 0.001 to 0.2% of the dry mix, or somewhat lower or higher, preferably from 0.025 to 0.12% and most desirably from 0.037 to 0.1%. Of the baking mix the range will advantageously be from 0.0008 to 0.15%. Of the shortening mix, there will suitably be from 0.02 to 3% of emulsifier, preferably from 0.5 to 2.5% and most desirably from 0.75 to 2%.

Of acid emulsifying agents of the mucilaginous type, it is desirable to use from 0.002 to 0.2% of the dry mix. Of acid emulsifying agents of the interfacial-tension reduction type, the desirable range is from 0.025 to 0.2% of the dry mix. With water soluble soap the desirable range is from 0.001 to 0.002% and will usually not exceed 0.0015% of the dry mix, although in some cases the quantity will be higher.

Where two types of emulsifying agent are used as later explained, the quantity of each may be quite small. For example, in a dry mix 0.02% of algin works well with 0.0011% of sodium stearate.

In many cases it is very desirable to employ in the baking mix and in the dry mix of the present invention, two types of emulsifying agents having complementary functions. One type operates by reducing the interfacial tension between the watery phase and the fat phase. Examples of this are lecithin, an acid emulsifying agent, and water soluble soap such as sodium stearate, sodium oleate, potassium palmitate, sodium palmitate or any other water soluble soap well known to the art. This type of emulsifying agent has superior properties in forming dispersions and producing dispersion stability. I find, however, that it does not enhance the ability to hold air or gas acting as a leavening agent, and actually reduces the volume of the baked product.

With the interfacial-tension-reduction type of emulsifying agent I will add also an acid emulsifying agent of the mucilaginous or gelatinous type (often called adhesive-cohesive). Examples of these are algin, gum tragacanth, locust bean gum, Irish moss, gelatine, pectin and gum arabic. These mucilaginous emulsifying agents greatly enhance the ability of the baking mix to hold air or gas of the leavening agent, and permits the use of more water, thus increasing the volume and moisture content of the baked product. At the same time, this combination of emulsifying agents aids in emulsification of the fat and increases the stability of the emulsion. This feature of the invention is particularly advantageous in incorporating the dry mix with the water phase of a dough formula.

Many people have difficulty in digesting triglyceride fat such as lard, particularly in unleavened products such as pie crust and tarts. I find that the presence of an acid emulsifying agent in the baking mix and in the dry mix greatly improves the digestibility of fats generally, especially triglyceride fat. This acid emulsifying agent may be lecithin or an acid emulsifying agent of the mucilaginous type, but for the reasons previously noted, I will preferably use both lecithin and an acid emulsifying agent of the mucilaginous type. For this reason lecithin is to be preferred to a water soluble soap as an interfacial-tension-reduction type emulsifying agent, but this feature is not as important as might otherwise be the case because the quantity of soap required is usually very small, and the quantity of mucilaginous type emulsifier is usually relatively much larger.

Where triglyceride fat such as lard is used, there is relatively greater advantage in employing an acid emulsifying agent of the mucilaginous type than would be otherwise the case, because triglyceride fat impairs the ability of the baking mix to hold gas or air necessary for leavening. An acid emulsifying agent of the mucilaginous type in combination with the stabilizer overcomes this tendency of the triglyceride fat, and makes it possible to make baked products actually of improved volume using triglyceride fat in the dry mix, along with the acid emulsifying agent of the mucilaginous type and the stabilizer.

Heretofore high sugar content cakes, white cakes and pound cakes could not be made, using present day standard formulae, and using ordinary triglyceride fat as the shortening. The dry mix of this invention using such triglyceride fat is ideal for such products, producing baked products with more moisture, more volume and other better characteristics than even the superglycerinated shortenings heretofore necessary for the production of such cakes. The difference is found in the power of the other ingredients of the dry mix in compound with triglyceride fats to change the action of such fats from being antagonistic to the retention of air, moisture vapors and gas to having an affinity for them.

It is very desirable to add an edible mold inhibitor to the dry mix, to prevent rancidity of the dry mix. It is also important to add a mold inhibitor in order to help prevent molding of the baked product itself.

A natural gum, gum guaiac, is a very satisfactory edible mold inhibitor. It is very effective in quantities from 0.02 to 0.1% of the dry mix, but preferably should be used in quantities from 0.04 to 0.1% and most desirably from 0.05 to 0.075%. This will suitably be 0.01 to 0.08% of the baking mix. Of the shortening mix, the range will advantageously be 0.4 to 2%, preferably from 0.8 to 2% and most desirably from 1 to 1.5%. Smaller quantities may be used. The edible mold inhibitor may however be added to the dry mix in larger amounts if it is desired to better protect the baked product in which the dry mix is incorporated.

Commercial gun guaiac contains some impurities such as tree bark. I have found it best to dissolve the gum guaiac in 190 proof ethanol, one part of gun guaiac to two or more parts of the ethanol. After short stirring, the undissolved material is removed by straining or by filtration. The resultant solution is then preferably added to a cool plastic fat or it may be added directly to the dry mix. Glycerine may be added to the premixed solution and plastic fat to help retard evaporation.

Any edible acid such as citric, phosphoric, ascorbic, or lactic, acts as an adjuvant in promoting the effectiveness of gum guaiac as a mold inhibitor. I prefer to use citric acid in a concentration in a plastic fat sufficient to introduce 0.01% in the dry mix. I prefer to use the following formula:

|  | Parts by weight |
|---|---|
| Gum guaiac | 1 |
| Ethanol | 2 |
| Lard | 6.9 |
| Citric acid | 0.1 |
|  | 10.0 |

The mixing process is to dissolve citric acid in lard at 290° F. Dissolve gum guaiac in ethanol and strain out foreign substances. Add by stirring, the resultant gum guaiac-ethanol solution to the lard-citric acid substances. The resultant mix is added to the dry mix in amounts sufficient to concentrate 0.1% of gum guaiac in the dry mix.

I have found n-butyl parahydroxybenzoate is an effective mold inhibitor for the shortening mix. Concentrations of about 0.02% to 0.04% by weight of the shortening mix or 0.001 to 0.002% of the dry mix are sufficient for the purpose. While this chemical is only soluble in proportions of 1 gm. in 5000 cc of water, it is readily soluble in ethanol. I prefer to use the following master batch formula:

|  | Parts |
|---|---|
| n-Butyl parahydroxylbenzoate | 24 |
| Ethyl alcohol | 96 |
| Glycerine | 360 |
|  | 480 |

The benzoate is dissolved in the alcohol after which the glycerine is added. The resultant solution is added in proper amounts to the dry mix, or it may be added to the plastic fat to be incorporated into the dry mix. All additions are made with stirring until the mass is homogeneous. While glycerine may be left out of the above formula its addition will help to retard the evaporation of the alcohol.

Other edible mold inhibitors may be used, such as propionic acid, phenols, and benzoic acid.

In general the mold inhibitors will be used in quantities varying from a trace such as 0.001% to 0.1% of the dry mix but in no case great enough to render the product inedible.

For best results, I prefer to use in the dry mix of the invention, about 0.5 to 1.8 of stabilizer, about 0.5 to 1.3% of humectant and about 2.5 to 4% fat, with sufficient emulsifying agent to emulsify all ingredients, and up to about 0.1% mold inhibitor.

The flour content in the dry mix will vary as in the prior art, ranges of from 25 to 90% being suitable, and ranges of from 30 to 85% preferable.

The total shortening mix in the dry mix will ordinarily range from 3 to 17%, preferably not exceeding 10%.

It will be understood that the dry mix of the present invention by its very nature should be devoid of watery liquids and likewise the shortening mix should be substantially without such liquids. In order to produce the baking mix from the dry mix, however, it is necessary to mix the dry mix with an extra amount of a proper watery liquid beyond that required to reconstitute the dried eggs and dried milk, so as to form a batter or dough baking mix as the case may be.

The watery liquid may be in whole or in part of any of the types commonly used such as water, milk, corn syrup, honey, or the like.

Water is required not only by the shortening mix, but also by dried milk and dried eggs, which should be converted to liquids so that they can act in conjunction with the dry ingredients such as flour, sugar, baking powder, salt and the like to form a suitable batter or dough. The water used to reconvert the dried milk and dried eggs into liquids is in addition to that required to condition the shortening mix ingredients. This feature is a departure from prior art dry mixes. In many of the examples a distinction has been drawn between the water or other watery liquid attributable to the shortening mix, and that attributable to the dried milk and dried eggs.

The shortening mix in all examples can be combined as follows:

All ingredients, except the mold inhibitor, are placed in a bowl, preferably a steam jacketted bowl or kettle, and heated to the melting point of the stabilizer and fat. Under one procedure the mass is then cooled with stirring to spraying consistency and the mold inhibitor added. The completed shortening mix can then be sprayed on, and mixed thoroughly in, the premixed ingredients forming the dry mix. Under another procedure, the mass can then be cooled to its coagulation point, the mold inhibitor added and the completed mix packaged for future use. It can then be used in the conventional manner of either softening to spraying consistency and applying as above or it may be incorporated into the premixed dry mix ingredients in its plastic state, all of which is well known in the art.

The dry mix may be made up in any suitable manner, as for example, by mixing the dry ingredients other than the shortening mix and spraying the shortening mix at a suitable temperature upon the dry ingredients with continuous mixing.

The baking mix may be likewise made up in any conventional manner well known in the art. Baking of yellow cakes will preferably be for 25 minutes at 375° F. in the examples.

As some of the ingredients of the shortening mix, for example the emulsifiers, may be in the form of powder or fine granules, these can less desirably be incorporated in the dry mix separately from the shortening mix, although it is preferred to introduce the emulsifier in the shortening mix before the shortening mix is added to the dry mix.

As well known in the art, superglycerinated hydrogenated vegetable oil shortening has been used exclusively in cakes containing more sugar than flour. In the so-called "well balanced" formulas, from 10 to 17% of superglycerinated shortening has been used in high sugar content cakes, based on the weight of the cake batter. The dry mix of the present invention not only reduces the quantity of superglycerinated shortening heretofore required, but permits the use of triglyceride fat in place of superglycerinated shortening and produces a superior baked product, representing about as much improvement over the superglycerinated shortenings as those represented over the prior art.

While the superglycerinated shortenings made possible the use of more sugar than flour in the layer cakes and caused increase in the volume with a corresponding light and tender texture as compared with similar products containing only triglyceride fats as shortening, the dry mix in the present invention not only makes possible a similar use of more sugar than flour, but also permits the inclusion and retention of more moisture than is possible with prior art superglycerinated shortening, and gives a baked product having even more volume, a more light, tender and resilient texture, more retained moisture, and longer shelf life, as well as less subject to mold growth, than superglycerinated shortening.

At the same time with the present invention, the triglyceride fat content can be cut to as little as 5% of the superglycerinated shortening heretofore used in cakes containing more sugar than flour. The cost can be reduced to about two-thirds of the cost of superglycerinated shortening and various other and cheaper edible fats, such as lard or other triglyceride fat may be employed.

No attempt will be made to show separate examples of the present invention as applied to doughnuts, coffee cakes, sweet rolls, rolls, biscuits, cookies and the like, and the examples will be confined to those which show the principles of compounding or applying the product of the invention. All percentages and parts herein are by weight unless otherwise stated.

It should be understood that the dry mix and baking mix formulae shown, are suggestive merely and that any suitable formula of a dry mix for cakes, sweet goods, biscuits, rolls, doughnuts and the like can be used in combination with the shortening mix formulae shown, when the shortening mix is used in amounts equal to and to take the place of prior art shortening, or any portion thereof, formerly specified in the formulae, and further provided that the percentage of watery liquid shown in the examples as attributed to the particular shortening mix shown is used in combination with the shortening mix, in the baking mix.

Wherever reference is made to using the shortening mix of the present invention in a dry mix instead of or in amounts equal to 100% or 50% of a prior art shortening, it will be understood that a deduction will be made from the quantity of shortening mix added to the dry mix for the watery liquid attributable to the shortening mix to be added in the baking mix.

Example 1 illustrates a shortening mix having a relatively low percentage of stabilizer (about 9%) while Example 2 indicates a shortening mix having a rather high proportion of stabilizer (about 21%).

Example 1.—Shortening mix

|  | Parts | Percent |
|---|---|---|
| Propylene glycol monostearate as stabilizer | 36.5 | 9.5 |
| Lard as fat | 300.0 | 78.1 |
| Algin as emulsifying agent | 3.0 | 0.8 |
| Glycerine as humectant | 42.0 | 10.9 |
| Gum guaiac as mold inhibitor | 2.5 | 0.7 |
| Total | 384.0 | 100.0 |

Example 1a.—Yellow cake dry mix

|  | Parts | Percent |
|---|---|---|
| Propylene glycol monostearate as stabilizer | 36.5 | 0.60 |
| Lard as fat | 300.0 | 4.98 |
| Algin as emulsifying agent | 3.0 | 0.05 |
| Glycerine as humectant | 42.0 | 0.70 |
| Gum guaiac as mold inhibitor | 2.5 | 0.04 |
| Total Example 1 shortening mix | 384.0 | 6.37 |
| Sugar | 2,844.0 | 47.19 |
| Flour | 1,969.0 | 32.67 |
| Powdered milk | 246.0 | 4.08 |
| Powdered eggs | 384.0 | 6.37 |
| Baking powder | 121.5 | 2.01 |
| Salt | 50.0 | 0.82 |
| Vanilla | 28.0 | 0.46 |
| Total dry mix | 6,026.5 | 99.97 |

Example 1b.—Yellow cake baking mix

|  | Parts | Percent |
|---|---|---|
| Propylene glycol monostearate as stabilizer | 36.5 | 0.40 |
| Lard as fat | 300.0 | 3.33 |
| Algin as emulsifying agent | 3.0 | 0.03 |
| Glycerine as humectant | 42.0 | 0.47 |
| Gum guaiac as mold inhibitor | 2.5 | 0.03 |
| Total Example 1 shortening mix | 384.0 | 4.26 |
| Sugar | 2,844.0 | 31.56 |
| Flour | 1,969.0 | 21.85 |
| Powdered milk | 246.0 | 2.73 |
| Powdered eggs | 384.0 | 4.26 |
| Baking powder | 121.5 | 1.34 |
| Salt | 50.0 | 0.55 |
| Vanilla | 28.0 | 0.31 |
| Total Example 1a dry mix | 6,026.5 | 66.86 |
| Water attributed to powdered milk | 1,723.0 | 19.12 |
| Water attributed to powdered eggs | 768.0 | 8.52 |
| Water attributed to shortening mix | 491.0 | 5.45 |
| Total yellow cake baking mix | 9,008.5 | 99.95 |

If, for example, the shortening heretofore used in a dry mix was about 9% or over based upon the weight of the baking mix, the shortening mix of Example 1 would be used to take the place of and in amounts equal to 100% of such shortening.

The resultant baked product when produced in the conventional manner will have more moisture and a larger volume than a product similar but containing prior art shortening in place of the shortening mix and added water attributed to the shortening mix, according to the present invention.

Example 2.—Shortening mix

|  | Parts | Percent |
|---|---|---|
| Propylene glycol monostearate as stabilizer | 62.0 | 21.0 |
| Lard as fat | 206.0 | 69.9 |
| Algin as emulsifying agent | 1.0 | 0.3 |
| Glycerine as humectant | 21.0 | 7.1 |
| Gum guaiac as mold inhibitor | 4.5 | 1.5 |
| Total | 294.5 | 99.8 |

Example 2a.—Yellow cake dry mix

|  | Parts | Percent |
|---|---|---|
| Propylene glycol monostearate as stabilizer | 62.0 | 1.04 |
| Lard as fat | 206.0 | 3.47 |
| Algin as emulsifying agent | 1.0 | 0.02 |
| Glycerine as humectant | 21.0 | 0.35 |
| Gum guaiac as mold inhibitor | 4.5 | 0.07 |
| Total Example 2 shortening mix | 294.5 | 4.95 |
| Sugar | 2,844.0 | 47.90 |
| Flour | 1,969.0 | 33.16 |
| Powdered milk | 246.0 | 4.14 |
| Powdered eggs | 384.0 | 6.46 |
| Baking powder | 121.5 | 2.04 |
| Salt | 50.0 | 0.84 |
| Vanilla | 28.0 | 0.47 |
| Total dry mix | 5,937.0 | 99.96 |

Example 2b.—Yellow cake baking mix

|  | Parts | Percent |
|---|---|---|
| Propylene glycol monostearate as stabilizer | 62.0 | 0.72 |
| Lard as fat | 206.0 | 2.40 |
| Algin as emulsifying agent | 1.0 | 0.01 |
| Glycerine as humectant | 21.0 | 0.24 |
| Gum guaiac as mold inhibitor | 4.5 | 0.05 |
| Total Example 2 shortening mix | 294.5 | 3.42 |
| Sugar | 2,844.0 | 33.18 |
| Flour | 1,969.0 | 22.97 |
| Powdered milk | 246.0 | 2.87 |
| Powdered eggs | 384.0 | 4.49 |
| Baking powder | 121.5 | 1.41 |
| Salt | 50.0 | 0.58 |
| Vanilla | 28.0 | 0.32 |
| Total Example 2a yellow cake dry mix | 5,937.0 | 69.24 |
| Water attributed to powdered milk | 1,723.0 | 20.10 |
| Water attributed to powdered eggs | 768.0 | 8.95 |
| Water attributed to shortening mix | 143.0 | 1.67 |
| Total yellow cake baking mix | 8,571.0 | 99.96 |

In a prior art dry mix containing 9% or over of shortening based upon the weight of the baking mix, the shortening mix of Example 2 may be used to take the place of and in amounts equal to 50% of such prior art shortening. The product of these examples has the same improved characteristics in respect to moisture, moisture retention, volume and texture as the product of Examples 1, 1a and 1b.

As already explained it is sometimes preferable to use two ester or ether stabilizers, rather than a single ester or ether. The preferred stabilizer is propylene glycol monostearate, but improved properties are introduced in some baked flour product formulas by including glycerol monostearate also, preferably in smaller amounts than the propylene glycol monostearate. The glycerol monostearate behaves quite differently in the baking mix from the propylene glycol monostearate. When used alone glycerol monostearate and distearate are not nearly so advantageous as propylene glycol monostearate because they do not produce as light a baked product, probably because the glycerol monostearate, having a higher melting point and a greater capacity for absorbing watery liquids, and possibly for other reasons unknown to me, is not as effective as propylene glycol monostearate in stopping shrinkage during the last few minutes of baking.

I find however that glycerol monostearate included with propylene glycol monostearate has a marked tendency to counteract the crumbly condition sometimes encountered in baked products, producing a structure which better maintains itself during the operations of icing, frosting, filling, and the like, and that the resultant baked product when made with the two different stabilizers, preferably with more propylene glycol monostearate than glycerol monostearate, is firmer and more resistant to damage during handling, while at the same time sufficiently light and edible.

The amount of glycerol monostearate which I prefer to use is from 50 to 100% of the quantity of propylene glycol monostearate as shown in Examples 3, 3a and 3b, although advantage will be gained with use of from 5 to 150%.

It will be evident that the effect obtained by this mixture of stabilizers is quite different from any obtained from a single ester in the prior art. Instead of glycerol monostearate the same effect is obtained with glycerol distearate or with the corresponding palmitates.

Examples 3, 3a and 3b also include an emulsifying agent.

*Example 3.—Shortening mix*

|  | Parts | Percent |
|---|---|---|
| Glyceryl monostearate as stabilizer | 14.0 | 4.0 |
| Propylene glycol monostearate as stabilizer | 28.0 | 8.0 |
| Lard as fat | 255.5 | 73.1 |
| Gelatin as emulsifying agent | 7.0 | 2.0 |
| Glycerine as humectant | 40.0 | 11.4 |
| Gum guaiac as mold inhibitor | 5.0 | 1.4 |
| Total shortening mix | 349.5 | 99.9 |

*Example 3a.—Yellow cake dry mix*

|  | Parts | Percent |
|---|---|---|
| Glycerol monostearate as stabilizer | 14.0 | 0.24 |
| Propylene glycol monostearate as stabilizer | 28.0 | 0.49 |
| Lard as fat | 255.5 | 4.46 |
| Gelatin as emulsifying agent | 7.0 | 0.12 |
| Glycerine as humectant | 40.0 | 0.70 |
| Gum guaiac as mold inhibitor | 5.0 | 0.09 |
| Total Example 3 shortening mix | 349.5 | 6.10 |
| Sugar | 2,625.0 | 45.78 |
| Flour | 1,969.0 | 34.33 |
| Powdered milk | 219.0 | 3.82 |
| Powdered eggs | 384.0 | 6.69 |
| Baking powder | 121.5 | 2.12 |
| Salt | 40.0 | 0.69 |
| Vanilla | 25.0 | 0.43 |
| Total yellow cake dry mix | 5,733.0 | 99.96 |

*Example 3b.—Yellow cake baking mix*

|  | Parts | Percent |
|---|---|---|
| Glyceryl monostearate as stabilizer | 14.0 | 0.17 |
| Propylene glycol monostearate as stabilizer | 28.0 | 0.34 |
| Lard as fat | 255.5 | 3.13 |
| Gelatin as emulsifying agent | 7.0 | 0.08 |
| Glycerine as humectant | 40.0 | 0.49 |
| Gum guaiac as mold inhibitor | 5.0 | 0.06 |
| Total Example 3 shortening mix | 349.5 | 4.27 |
| Sugar | 2,625.0 | 32.18 |
| Flour | 1,969.0 | 24.14 |
| Powdered milk | 219.0 | 2.68 |
| Powdered eggs | 384.0 | 4.70 |
| Baking powder | 121.5 | 1.49 |
| Salt | 40.0 | 0.49 |
| Vanilla | 25.0 | .30 |
| Total Example 3a dry mix | 5,733.0 | 70.25 |
| Water attributed to powdered milk | 1,530.0 | 18.76 |
| Water attributed to powdered eggs | 768.0 | 9.41 |
| Water attributed to shortening mix | 125.0 | 1.53 |
| Total yellow cake baking mix | 8,156.0 | 99.95 |

The resultant baked product will be slightly more compacted than a similar product containing only propylene glycol monostearate, but will be superior in resistance to damage, and will be of higher moisture content, more resilient and more velvety in texture and with higher volume than when a product is used similar but containing prior art shortening, in place of the shortening of Example 3 and the water attributable thereto.

If the prior art shortening used in a dry mix was about 9% or over based upon the weight of the baking mix, the shortening mix of Example 8 may be used in place of and in amounts equal to 50% of such shortening.

In some cases it may be desirable to introduce part of the ingredients normally included with the dry mix at the time the baking is made up. Examples 4, 4a, and 4b show a formula in which part of the fat is left out of the shortening mix and the dry mix and added to the baking mix. These examples also show an abnormally large amount of stabilizer used in each of the three mixes along with a very small amount of watery liquid in the baking mix.

*Example 4.—Shortening mix*

|  | Parts | Percent |
|---|---|---|
| Propylene glycol monostearate as stabilizer | 164.0 | 43.39 |
| Lard as fat | 164.0 | 43.39 |
| Algin as emulsifying agent | 5.0 | 1.32 |
| Glycerine as humectant | 40.0 | 10.59 |
| Gum guaiac as mold inhibitor | 5.0 | 1.32 |
| Total shortening mix | 378.0 | 100.01 |

*Example 4a.—Yellow cake dry mix*

|  | Parts | Percent |
|---|---|---|
| Propylene glycol monostearate as stabilizer | 164.0 | 2.72 |
| Lard as fat | 164.0 | 2.72 |
| Algin as emulsifying agent | 5.0 | 0.08 |
| Glycerine as humectant | 40.0 | 0.66 |
| Gum guaiac as mold inhibitor | 5.0 | 0.08 |
| Total Example 4 shortening mix | 378.0 | 6.26 |
| Sugar | 2,625.0 | 43.61 |
| Flour | 2,187.5 | 36.33 |
| Powdered milk | 246.0 | 4.09 |
| Powdered eggs | 384.0 | 6.38 |
| Baking powder | 121.5 | 2.02 |
| Salt | 50.0 | 0.83 |
| Vanilla | 27.0 | 0.44 |
| Total dry mix | 6,019.0 | 99.96 |

*Example 4b.—Yellow cake baking mix*

|  | Parts | Percent |
|---|---|---|
| Propylene glycol monostearate as stabilizer | 164.0 | 1.80 |
| Lard as fat | 164.0 | 1.80 |
| Algin as emulsifying agent | 5.0 | 0.05 |
| Glycerine as humectant | 40.0 | 0.43 |
| Gum guaiac as mold inhibitor | 5.0 | 0.05 |
| Total Example 4 shortening mix | 378.0 | 4.13 |
| Sugar | 2,625.0 | 28.81 |
| Flour | 2,187.5 | 24.01 |
| Powdered milk | 246.0 | 2.70 |
| Powdered eggs | 384.0 | 4.21 |
| Baking powder | 121.5 | 1.33 |
| Salt | 50.0 | 0.55 |
| Vanilla | 27.0 | 0.29 |
| Total Example 4a dry mix | 6,019.0 | 66.03 |
| Lard as fat | 136.0 | 1.49 |
| Water attributed to powdered milk | 1,723.0 | 18.91 |
| Water attributed to powdered eggs | 768.0 | 8.43 |
| Water attributed to shortening mix | 464.0 | 5.09 |
| Total yellow cake baking mix | 9,110.0 | 99.95 |

The dry mix is placed in a mixing bowl with the added lard and mixed at low speed. The water is then added in several stages and mixing continued for about ten minutes or until a smooth high volume is secured.

This shortening of Example 4 may be used instead of and in amounts equal to 100% of any prior art shortening in any dry mix.

The resultant baked product is more moist and has a larger volume than a product similar but containing prior art shortening in place of the shortening mix, together with the water and lard cooperating with the shortening mix, in accordance with the present invention.

Reference has already been made to the remarkable results obtained in the present invention using very small amounts of fat as compared with prior art practice. This is illustrated in Examples 5, 5a and 5b.

*Example 5.—Shortening mix*

|  | Parts | Percent |
|---|---|---|
| Propylene glycol monostearate as stabilizer | 85.0 | 47.5 |
| Lard as fat | 44.0 | 24.58 |
| Algin as emulsifying agent | 3.0 | 1.68 |
| Glycerine as humectant | 44.0 | 24.58 |
| Gum guaiac as mold inhibitor | 3.0 | 1.68 |
| Total | 179.0 | 100.02 |

*Example 5a.—Yellow cake dry mix*

|  | Parts | Percent |
|---|---|---|
| Propylene glycol monostearate as stabilizer | 85.0 | 1.46 |
| Lard as fat | 44.0 | .76 |
| Algin as emulsifying agent | 3.0 | 0.07 |
| Glycerine as humectant | 44.0 | 1.46 |
| Gum guaiac as mold inhibitor | 3.0 | 0.07 |
| Total Example 5 shortening mix | 179.0 | 3.82 |
| Sugar | 2,844.0 | 48.88 |
| Flour | 1,969.0 | 33.84 |
| Powdered milk | 246.0 | 4.22 |
| Powdered eggs | 384.0 | 6.60 |
| Baking powder | 121.0 | 2.07 |
| Salt | 50.0 | 0.85 |
| Vanilla | 25.0 | 0.43 |
| Total | 5,818.0 | 100.71 |

*Example 5b.—Yellow cake baking mix*

|  | Parts | Percent |
|---|---|---|
| Propylene glycol monostearate as stabilizer | 85.0 | 0.99 |
| Lard as fat | 44.0 | 0.51 |
| Algin as emulsifying agent | 3.0 | 0.04 |
| Glycerine as humectant | 44.0 | 0.51 |
| Gum guaiac as mold inhibitor | 3.0 | 0.04 |
| Total Example 5 shortening mix | 179.0 | 2.09 |
| Sugar | 2,844.0 | 33.13 |
| Flour | 1,969.0 | 22.94 |
| Powdered milk | 246.0 | 2.86 |
| Powdered eggs | 384.0 | 4.47 |
| Baking powder | 121.0 | 1.41 |
| Salt | 50.0 | 0.58 |
| Vanilla | 25.0 | 0.29 |
| Total Example 5a dry mix | 5,818.0 | 67.77 |
| Water attributed to powdered milk | 1,723.0 | 20.07 |
| Water attributed to powdered eggs | 768.0 | 8.94 |
| Water attributed to shortening mix | 273.0 | 3.18 |
| Total baking mix | 8,582.0 | 99.96 |

The shortening mix of Example 5 may be used instead of any prior art shortening and to the extent of 50% thereof in any dry mix.

The resultant baked product is more moist, has more volume and has a more soft resilient texture than a similar product using prior art shortening in place of the shortening of Example 5. Another illustration of an extremely small quantity of stabilizer plus lard, which produces a highly satisfactory product, is given in Example 6.

*Example 6.—Shortening mix*

|  | Parts | Percent |
|---|---|---|
| Propylene glycol monostearate as stabilizer | 42.0 | 16.57 |
| Lard as fat | 166.0 | 65.48 |
| Algin as emulsifying agent | 1.0 | 0.39 |
| Glycerine as humectant | 40.0 | 15.78 |
| Gum guaiac as mold inhibitor | 4.5 | 1.78 |
| Total shortening mix | 253.5 | 100.00 |

*Example 6a.—Yellow cake dry mix*

|  | Parts | Percent |
|---|---|---|
| Propylene glycol monostearate as stabilizer | 42.0 | 0.71 |
| Lard as fat | 166.0 | 2.82 |
| Algin as emulsifying agent | 1.0 | 0.02 |
| Glycerine as humectant | 40.0 | 0.69 |
| Gum guaiac as mold inhibitor | 4.5 | 0.08 |
| Total Example 6 shortening mix | 253.5 | 4.32 |
| Sugar | 2,844.0 | 48.26 |
| Flour | 1,969.0 | 33.41 |
| Powdered milk | 246.0 | 4.17 |
| Powdered eggs | 384.0 | 6.51 |
| Baking powder | 121.0 | 2.05 |
| Salt | 50.0 | 0.85 |
| Vanilla | 25.0 | 0.43 |
| Total | 5,892.5 | 100.00 |

*Example 6b.—Yellow cake baking mix*

|  | Parts | Percent |
|---|---|---|
| Propylene glycol monostearate as stabilizer | 42.0 | 0.49 |
| Lard as fat | 166.0 | 1.96 |
| Algin as emulsifying agent | 1.0 | 0.01 |
| Glycerine as humectant | 40.0 | 0.47 |
| Gum guaiac as mold inhibitor | 4.5 | 0.05 |
| Total Example 6 shortening mix | 253.5 | 2.98 |
| Sugar | 2,844.0 | 33.19 |
| Flour | 1,969.0 | 22.98 |
| Powdered milk | 246.0 | 2.87 |
| Powdered eggs | 384.0 | 4.48 |
| Baking powder | 121.0 | 1.41 |
| Salt | 50.0 | 0.58 |
| Vanilla | 25.0 | 0.29 |
| Total Example 6a dry mix | 5,892.5 | 68.78 |
| Water attributed to powdered milk | 1,723.0 | 20.18 |
| Water attributed to powdered eggs | 768.0 | 8.96 |
| Water attributed to shortening mix | 185.0 | 2.16 |
| Total baking mix | 8,568.5 | 100.08 |

The shortening mix of Example 6 may be substituted for any prior art shortening in amounts equal to 50% of such shortening in any baking mix.

The resultant baked product is more moist and has a higher volume and a softer smoother resilient texture than a similar product using prior art shortening in place of the shortening of Example 6.

The shortening of Example 7 listed below may be used instead of and in amounts equal to 50% of the prior art shortening in any dry mix.

*Example 7.—Shortening mix*

|  | Parts | Percent |
|---|---|---|
| Propylene Glycol Monostearate as stabilizer | 27.0 | 9.6 |
| Lard as fat | 220.5 | 78.47 |
| Algin as emulsifier | 1.3 | 0.46 |
| Glycerine as humectant | 31.0 | 11.03 |
| Gum Guaiac as mold inhibitor | 1.2 | 0.46 |
| Total shortening mix | 281.0 | 100.02 |

*Example 7a.—Yellow cake dry mix*

|  | Parts | Percent |
|---|---|---|
| Propylene Glycol Monostearate as stabilizer | 27.0 | 0.46 |
| Lard as fat | 220.5 | 3.72 |
| Algin as emulsifier | 1.3 | 0.02 |
| Glycerine as humectant | 31.0 | 0.52 |
| Gum guaiac as mold inhibitor | 1.2 | 0.02 |
| Total Example 7 Shortening Mix | 281.0 | 4.74 |
| Sugar | 2,844.0 | 48.04 |
| Flour | 1,969.0 | 33.26 |
| Powdered Milk | 246.0 | 4.15 |
| Powdered Eggs | 384.0 | 6.48 |
| Baking Powder | 121.0 | 2.04 |
| Salt | 50.0 | 0.58 |
| Vanilla | 25.0 | 0.29 |
| Total Dry Mix | 5,920.0 | 99.58 |

Example 7b.—Yellow cake baking mix

| | Parts | Percent |
|---|---|---|
| Propylene Glycol Monostearate as stabilizer | 27.0 | 0.31 |
| Lard as fat | 220.5 | 2.56 |
| Algin as emulsifier | 1.3 | 0.015 |
| Glycerine as humectant | 31.0 | 0.360 |
| Gum Guaiac as mold inhibitor | 1.2 | 0.015 |
| Total Example 7 Shortening Mix | 281.0 | 3.26 |
| Sugar | 2,844.0 | 33.09 |
| Flour | 1,969.0 | 22.9 |
| Powdered Milk | 246.0 | 2.86 |
| Powdered Eggs | 384.0 | 4.46 |
| Baking Powder | 121.0 | 1.4 |
| Salt | 50.0 | 0.58 |
| Vanilla | 25.0 | 0.29 |
| Total Example 7a Dry Mix | 5,920.0 | 68.84 |
| Water attributed to Powdered Milk | 1,723.0 | 20.04 |
| Water attributed to Powdered Eggs | 768.0 | 8.93 |
| Water attributed to Powdered Shortening Mix | 185.0 | 2.15 |
| Total | 8,596.0 | 99.96 |

The resultant baked product will have more moisture and a larger volume than a product similar but containing prior art shortening in place of the shortening of Example 7.

Example 8.—Shortening mix

| | Parts | Percent |
|---|---|---|
| Propylene glycol monostearate as stabilizer | 49.6 | 12.65 |
| Lard as fat | 295.3 | 75.33 |
| Algin as emulsifying agent | 3.3 | 0.84 |
| Glycerine as humectant | 41.4 | 10.56 |
| Gum guaiac as mold inhibitor | 2.4 | 0.61 |
| Total shortening mix | 392.0 | 99.99 |

Example 8a.—Yellow cake dry mix

| | Parts | Percent |
|---|---|---|
| Propylene glycol monostearate as stabilizer | 49.6 | 0.85 |
| Lard as fat | 295.3 | 5.10 |
| Algin as emulsifier | 3.3 | 0.05 |
| Glycerine as humectant | 41.4 | 0.71 |
| Gum guaiac as mold inhibitor | 2.4 | 0.04 |
| Total Example 8 shortening mix | 392.0 | 6.75 |
| Sugar | 2,625.0 | 45.37 |
| Flour | 1,969.0 | 34.03 |
| Powdered milk | 219.0 | 3.78 |
| Powdered eggs | 384.0 | 6.63 |
| Baking powder | 121.0 | 2.08 |
| Salt | 50.0 | 0.86 |
| Vanilla | 25.0 | 0.43 |
| Total dry mix | 5,785.0 | 99.93 |

Example 8b.—Yellow cake baking mix

| | Parts | Percent |
|---|---|---|
| Propylene glycol monostearate as stabilizer | 49.6 | 0.56 |
| Lard as fat | 295.3 | 3.37 |
| Algin as emulsifier | 3.3 | 0.037 |
| Glycerine as humectant | 41.4 | 0.47 |
| Gum guaiac as mold inhibitor | 2.4 | 0.02 |
| Total Example 8 shortening mix | 392.0 | 4.46 |
| Sugar | 2,625.0 | 29.94 |
| Flour | 1,969.0 | 22.45 |
| Powdered milk | 219.0 | 2.49 |
| Powdered eggs | 384.0 | 4.38 |
| Baking powder | 121.0 | 1.38 |
| Salt | 50.0 | 0.57 |
| Vanilla | 25.0 | 0.28 |
| Total Example 8a dry mix | 5,785.0 | 65.95 |
| Water attributed to powdered milk | 1,730.0 | 19.73 |
| Water attributed to powdered eggs | 768.0 | 8.76 |
| Water attributed to shortening mix | 482.0 | 5.50 |
| Total baking mix | 8,765.0 | 99.94 |

If, for example, the shortening heretofore used in a dry mix was about 9% or over based upon the weight of the baking mix, the shortening mix of Example 8 would be used to take the place of and in amounts equal to 100% of such shortening. The resulting baked product has more moisture and a larger volume and better texture than a similar product containing prior art shortening instead of the shortening of Example 8.

If, for example, the shortening used in the prior art in a dry mix formula was about 9% or over by weight of the baking mix, the shortening mix of Example 9 would be used to take the place of and in amounts equal to 50% of such shortening. The baked product has the same desirable characteristics as mentioned in Examples 1, 1a, and 1b.

The amount of water can be reduced for example to 270 parts in Example 9 if the resultant mix is used in amount of 50% of the prior art shortening heretofore used in dry mixes. The water may be increased also as shown in Example 10.

Example 9.—Shortening mix

| | Parts | Percent |
|---|---|---|
| Propylene glycol monostearate as stabilizer | 86.6 | 51.91 |
| Lard as fat | 43.3 | 25.95 |
| Algin as emusifier | 3.0 | 1.8 |
| Glycerine as humectant | 29.5 | 17.68 |
| Gum guaiac as mold inhibitor | 4.4 | 2.65 |
| Total shortening mix | 166.8 | 99.99 |

Example 9a.—Yellow cake dry mix

| | Parts | Percent |
|---|---|---|
| Propylene glycol monostearate as stabilizer | 86.6 | 1.55 |
| Lard as fat | 43.3 | 0.78 |
| Algin as emulsifier | 3.0 | 0.05 |
| Glycerine as humectant | 29.5 | 0.53 |
| Gum guaiac as mold inhibitor | 4.4 | 0.07 |
| Total Example 9 shortening mix | 166.8 | 2.98 |
| Sugar | 2,625.0 | 47.21 |
| Flour | 1,969.0 | 35.41 |
| Powdered milk | 219.0 | 3.93 |
| Powdered eggs | 384.0 | 6.90 |
| Baking powder | 121.0 | 2.10 |
| Salt | 50.0 | 0.89 |
| Vanilla | 25.0 | 0.45 |
| Total dry mix | 5,559.8 | 99.87 |

Example 9b.—Yellow cake baking mix

| | Parts | Percent |
|---|---|---|
| Propylene glycol monostearate as stabilizer | 86.6 | 1.03 |
| Lard as fat | 43.3 | 0.52 |
| Algin as emulsifier | 3.0 | 0.03 |
| Glycerine as humectant | 29.5 | 0.30 |
| Gum guaiac as mold inhibitor | 4.4 | 0.05 |
| Total Example 9 shortening mix | 166.8 | 1.93 |
| Sugar | 2,625.0 | 31.51 |
| Flour | 1,969.0 | 23.64 |
| Powdered milk | 219.0 | 2.62 |
| Powdered eggs | 384.0 | 4.61 |
| Baking powder | 121.0 | 1.45 |
| Salt | 50.0 | 0.60 |
| Vanilla | 25.0 | 0.30 |
| Total Example 9a Dry Mix | 5,559.8 | 66.66 |
| Water attributed to powsered milk | 1,730.0 | 20.77 |
| Water attributed to powdered eggs | 768.0 | 9.22 |
| Water attributed to shortening mix | 270.7 | 3.25 |
| Total baking mix | 8,328.5 | 99.90 |

Example 10.—Shortening mix

| | Parts | Percent |
|---|---|---|
| Propylene glycol monostearate as stabilizer | 74.5 | 24.19 |
| Lard as fat | 199.5 | 64.77 |
| Algin as emulsifier | 3.7 | 1.20 |
| Glycerine as humectant | 28.0 | 9.09 |
| Gum guaiac as mold inhibitor | 2.3 | 0.74 |
| Total shortening mix | 308.0 | 99.99 |

*Example 10a.—Yellow cake dry mix*

|  | Parts | Percent |
|---|---|---|
| Propylene glycol monostearate as stabilizer | 74.5 | 1.25 |
| Lard as fat | 199.5 | 3.36 |
| Algin as emulsifier | 3.7 | 0.06 |
| Glycerine as humectant | 28.0 | 0.47 |
| Gum guaiac as mold inhibitor | 2.3 | 0.04 |
| Total Example 10 shortening mix | 308.0 | 5.18 |
| Sugar | 2,844.0 | 48.04 |
| Flour | 1,969.0 | 33.26 |
| Powdered milk | 219.0 | 3.69 |
| Powdered eggs | 384.0 | 6.48 |
| Baking powder | 121.0 | 2.04 |
| Salt | 50.0 | 0.84 |
| Vanilla | 25.0 | 0.42 |
| Total dry mix | 5,920.0 | 99.95 |

*Example 10b.—Yellow cake baking mix*

|  | Parts | Percent |
|---|---|---|
| Propylene glycol monostearate as stabilizer | 74.5 | 0.82 |
| Lard as fat | 199.5 | 2.22 |
| Algin as emulsifier | 3.7 | 0.04 |
| Glycerine as humectant | 28.0 | 0.31 |
| Gum guaiac as mold inhibitor | 2.3 | 0.02 |
| Total Example 10 shortening mix | 308.0 | 3.41 |
| Sugar | 2,844.0 | 31.65 |
| Flour | 1,969.0 | 21.91 |
| Powdered milk | 384.0 | 4.27 |
| Powdered eggs | 219.0 | 2.43 |
| Baking powder | 121.0 | 1.34 |
| Salt | 50.0 | 0.55 |
| Vanilla | 25.0 | 0.28 |
| Total Example 10a dry mix | 5,920.0 | 65.84 |
| Water attributed to powdered milk | 1,730.0 | 19.25 |
| Water attributed to powdered eggs | 768.0 | 8.54 |
| Water attributed to shortening mix | 567.0 | 6.31 |
| Total baking mix | 8,985.0 | 99.94 |

If, for example, the shortening heretofore used in a dry mix formula was about 9% or more based upon the weight of the baking mix, the shortening mix of Example 10 may be used to take the place of and in amounts equal to 100% of such shortening used in the prior art. In a like manner the shortening mix of Example 10 may be used to take the place of and in amounts equal to 100% of the shortening used in the prior art in dry mixes and in baking mixes made from such dry mixes. The resultant baked product will have more moisture and volume and a smoother, softer and more resilient texture than a product similar but containing prior art shortening in place of that of Example 10.

The humectant will desirably be included in the shortening mix and carried through the dry mix and baking mix as shown in Examples 11, 11a and 11b and 12, 12a and 12b.

*Example 11.—Shortening mix*

|  | Parts | Percent |
|---|---|---|
| Propylene glycol monostearate as stabilizer | 51.9 | 14.6 |
| Lard as fat | 277.8 | 78.14 |
| Algin as emulsifying agent | 2.6 | 0.73 |
| Glycerine as humectant | 18.1 | 5.09 |
| Gum guaiac as mold inhibitor | 5.1 | 1.43 |
| Total shortening mix | 355.5 | 99.99 |

*Example 11a.—Yellow cake dry mix*

|  | Parts | Percent |
|---|---|---|
| Propylene glycol monostearate as stabilizer | 51.9 | 0.87 |
| Lard as fat | 277.8 | 4.63 |
| Algin as emulsifying agent | 2.6 | 0.04 |
| Glycerine as humectant | 18.1 | 0.30 |
| Gum guaiac as mold inhibitor | 5.1 | 0.09 |
| Total Example 11 shortening mix | 355.5 | 5.93 |

*Example 11a.—Yellow cake dry mix—Continued*

|  | Parts | Percent |
|---|---|---|
| Sugar | 2,844.0 | 47.43 |
| Flour | 1,969.0 | 32.84 |
| Powdered milk | 246.0 | 4.13 |
| Powdered eggs | 384.0 | 6.44 |
| Baking powder | 121.0 | 2.01 |
| Salt | 50.0 | 0.93 |
| Vanilla | 26.0 | 0.41 |
| Total dry mix | 5,995.5 | 100.12 |

*Example 11b.—Yellow cake baking mix*

|  | Parts | Percent |
|---|---|---|
| Propylene glycol monostearate as stabilizer | 51.9 | 0.58 |
| Lard as fat | 277.8 | 3.08 |
| Algin as emulsifying agent | 2.6 | 0.03 |
| Glycerine as humectant | 18.1 | 0.20 |
| Gum guaiac as mold inhibitor | 5.1 | 0.06 |
| Total Example 11 shortening agent | 355.5 | 3.95 |
| Sugar | 2,844.0 | 31.57 |
| Flour | 1,969.0 | 21.86 |
| Powdered milk | 246.0 | 2.73 |
| Powdered eggs | 384.0 | 4.26 |
| Baking powder | 121.0 | 1.34 |
| Salt | 50.0 | 0.55 |
| Vanilla | 26.0 | 0.28 |
| Total Example 11a dry mix | 5,995.5 | 66.54 |
| Water attributed to dried milk | 1,723.0 | 19.13 |
| Water attributed to dried eggs | 768.0 | 8.52 |
| Water attributed to shortening mix | 519.5 | 5.76 |
| Total | 9,006.0 | 99.95 |

If, for example, the prior art shortening used in a dry mix formula was about 9% of the weight of the baking mix, the shortening mix of Example 11 may be used in place of and in amounts equal to 100% of such shortening. In a like manner the shortening mix may be used to take the place of and in amounts equal to 100% of the prior art shortening heretofore used in any dry mix formula.

The resultant baked product will have longer shelf life, be more moist and more velvety in texture than a product similar but containing prior art shortening in place of the shortening mix of the present invention and the water attributable thereto.

*Example 12.—Shortening mix*

|  | Parts | Percent |
|---|---|---|
| Propylene glycol monostearate as stabilizer | 53.0 | 7.34 |
| Superglycerinated hydrogenated vegetable oil fat | 310.0 | 42.96 |
| Algin as emulsifying agent | 6.0 | 0.83 |
| Glycerine as humectant | 348.0 | 48.24 |
| Gum guaiac as mold inhibitor | 4.5 | 0.62 |
| Total shortening mix | 721.5 | 99.99 |

*Example 12a.—Yellow cake dry mix*

|  | Parts | Percent |
|---|---|---|
| Propylene glycol monostearate as stabilizer | 53.0 | 0.83 |
| Superglycerinated hydrogenated vegetable oil fat | 310.0 | 4.87 |
| Algin as emulsifying agent | 6.0 | 0.09 |
| Glycerine as humectant | 348.0 | 5.47 |
| Gum guaiac as mold inhibitor | 4.5 | 0.07 |
| Total Example 12 shortening mix | 721.5 | 11.33 |
| Sugar | 2,844.0 | 44.71 |
| Flour | 1,969.0 | 30.95 |
| Powdered milk | 246.0 | 3.87 |
| Powdered eggs | 384.0 | 6.03 |
| Baking powder | 121.5 | 1.91 |
| Salt | 50.0 | 0.78 |
| Vanilla | 25.0 | 0.39 |
| Total dry mix | 6,361.0 | 99.97 |

Example 12b.—Yellow cake baking mix

| | Parts | Percent |
|---|---|---|
| Propylene glycol monostearate as stabilizer | 53.0 | 0.59 |
| Superglycerinated hydrogenated vegetable oil fat | 310.0 | 3.44 |
| Algin as emulsifying agent | 6.0 | 0.07 |
| Glycerine as humectant | 348.0 | 3.86 |
| Gum guaiac as mold inhibitor | 4.5 | 0.05 |
| Total Example 12 shortening mix | 721.5 | 8.01 |
| Sugar | 2,844.0 | 31.58 |
| Flour | 1,969.0 | 21.36 |
| Powdered milk | 246.0 | 2.73 |
| Powdered eggs | 384.0 | 4.26 |
| Baking powder | 121.5 | 1.34 |
| Salt | 50.0 | 0.55 |
| Vanilla | 25.0 | 0.28 |
| Total Example 12a dry mix | 6,361.0 | 70.11 |
| Water attributed to dried milk | 1,723.0 | 19.13 |
| Water attributed to dried eggs | 768.0 | 8.52 |
| Water attributed to shortening mix | 153.5 | 1.70 |
| Total baking mix | 9,005.5 | 99.46 |

The shortening mix of Example 12 may be used instead of and in amounts equal to 100% of the prior art shortening used in any dry mix.

The resultant baked product will be more moist, have a longer shelf life, have larger volume and a smoother, softer and more resilient texture than a product similar but containing prior art shortening in place of the shortening mix of Example 12 and the water attributed thereto.

Examples 13, 13a and 13b, 14, 14a and 14b, and 15, 15a and 15b illustrate the application of the invention to pie crust formulas.

Example 13.—Shortening mix

| | Parts | Percent |
|---|---|---|
| Propylene glycol monostearate as stabilizer | 1 | 0.61 |
| Lard as fat | 160 | 98.30 |
| Algin as emulsifying agent | 2 | 1.23 |
| Total shortening mix | 163 | 100.14 |

Example 13a.—Pie crust dry mix

| | Parts | Percent |
|---|---|---|
| Propylene glycol monostearate as stabilizer | 1 | 0.2 |
| Lard as fat | 160 | 35.4 |
| Algin as emulsifying agent | 2 | 0.4 |
| Total Example 13 shortening mix | 163 | 36.0 |
| Flour | 290 | 64.0 |
| Salt | 0.5 | 0.1 |
| Total dry mix | 453.5 | 100.1 |

Example 13b.—Pie crust baking mix

| | Parts | Percent |
|---|---|---|
| Propylene glycol monostearate as stabilizer | 1 | 0.2 |
| Lard as fat | 160 | 27.9 |
| Algin as emulsifying agent | 2 | 0.3 |
| Total Example 13 shortening mix | 163 | 28.4 |
| Flour | 290 | 50.6 |
| Salt | .5 | 0.1 |
| Total Example 13a dry mix | 453.5 | 79.1 |
| Water | 120 | 20.9 |
| Total baking mix | 573.5 | 100.0 |

The baked product resulting from the above pie crust is unusually mealy or flaky.

Example 14.—Shortening mix

| | Parts | Percent |
|---|---|---|
| Propylene glycol monostearate as stabilizer | 7 | 4.04 |
| Lard as fat | 160 | 92.70 |
| Algin as emulsifying agent | 2 | 1.16 |
| Dextrose | 4 | 2.32 |
| Total shortening mix | 173 | 100.22 |

Example 14a.—Pie crust dry mix

| | Parts | Percent |
|---|---|---|
| Propylene glycol monostearate as stabilizer | 7 | 1.5 |
| Lard as fat | 160 | 34.6 |
| Algin as emulsifying agent | 2 | 0.4 |
| Dextrose | 4 | 0.9 |
| Total Example 14 shortening mix | 173 | 37.4 |
| Flour | 290 | 62.7 |
| Salt | 0.5 | 0.1 |
| Total dry mix | 463.5 | 100.2 |

Example 14b.—Pie crust baking mix

| | Parts | Percent |
|---|---|---|
| Propylene glycol monostearate as stabilizer | 7 | 1.2 |
| Lard as fat | 160 | 27.4 |
| Algin as emulsifying agent | 2 | .3 |
| Dextrose | 4 | .7 |
| Total Example 14 shortening mix | 173 | 29.6 |
| Flour | 290 | 49.6 |
| Salt | 0.5 | 0.1 |
| Total Example 14a dry mix | 463.5 | 79.3 |
| Water | 120 | 20.6 |
| Total Baking mix | 583.5 | 99.9 |

The dextrose adds slight sweetening and improves the brown color of the baked product. The quality of the product obtained in Example 14, 14a and 14b is similar to that in Examples 13, 13a and 13b.

Less shrinkage will occur where a humectant is employed, preferably from 0.1 to 0.4% of the dry mix.

Example 15.—Shortening mix

| | Parts | Percent |
|---|---|---|
| Glycerol monopalmitate as stabilizer | 1 | 0.6 |
| Lard as fat | 160 | 97.8 |
| Locust bean gum as emulsifying agent | 2 | 1.2 |
| Glycerine as humectant | 1 | 0.6 |
| Total | 164 | 100.2 |

Example 15a.—Pie crust dry mix

| | Parts | Percent |
|---|---|---|
| Glycerol monopalmitate as stabilizer | 1 | 0.2 |
| Lard as fat | 160 | 35.2 |
| Locust bean gum as emulsifying agent | 2 | 0.4 |
| Glycerine as humectant | 1 | 0.2 |
| Total Example 15 shortening mix | 164 | 36.0 |
| Flour | 290 | 64.0 |
| Salt | 0.5 | .1 |
| Total dry mix | 454.5 | 100.1 |

Example 15b.—Pie crust baking mix

| | Parts | Percent |
|---|---|---|
| Glycerol monopalmitate as stabilizer | 1 | 0.2 |
| Lard as fat | 160 | 27.8 |
| Locust bean gum as emulsifying agent | 2 | .3 |
| Glycerine as humectant | 1 | .2 |
| Total Example 15 shortening mix | 164 | 28.5 |
| Flour | 290 | 50.5 |
| Salt | 0.5 | .1 |
| Total Example 15a dry mix | 454.5 | 79.1 |
| Water | 120 | 20.9 |
| Total baking mix | 574.5 | 100.0 |

The quality of the product of Example 15b is the same as that of Examples 13b and 14b except that less shrinkage is present in the product of Example 15b.

The shortening mixes of Examples 13, 14, and 15 may be substituted for prior art shortenings in dry mixes to the extent of and in amount equal to 100% of such prior art shortenings.

An important feature of the invention is that I can by proper choice of ingredients and proper selection of the order of mixing, partially or wholly protect flour in pie crusts and the like against glutenizing and produce pie crusts which are more short and mealy. At the same time I make it possible to produce a pie crust dough which is not harmed by excessive mixing and does not necessitate special precautions such as control of temperature.

Before incorporating watery liquid with the flour, I mix an emulsifying agent with the fat, and then incorporate watery liquid with the mixture of fat and emulsifying agent before adding it to the flour. By this procedure the presence of the emulsifying agent with the fat prevents the water phase from harming the flour during the process of mixing. It will be understood of course that better results will be obtained with an adequate quantity of emulsifying agent, and that it is preferable to use an acid emulsifying agent of the mucilaginous type to obtain this result. For best results the quantity of emulsifying agent should vary from about 0.5 to 1.2% of the mixture of fat, emulsifying agent and water, but it will be understood by reference to the above table that higher and lower percentages may be used.

In the numerous examples given, an attempt has been made to show those skilled in the art the range of usefulness of the present product, but it is not intended in any way to restrict the applicant's invention, either from the standpoint of possible use or possible range of composition.

Unless otherwise stated, all percentages herein are by weight.

In my U. S. Patent 2,508,393 issued May 23, 1950, I disclosed a shortening for butter, dough and the like.

In view of my invention and disclosure variations and modifications to meet individual whim or particular need will doubtless become evident to others skilled in the art, to obtain all or part of the benefits of my invention without copying the product and process shown, and I therefore, claim all such insofar as they fall within the reasonable spirit and scope of my claims.

Having thus described my invention what I claim as new and desire to secure by Letters Patent is:

1. A dry mix for baked flour products comprising flour, a shortening agent including a fat present in from 15 to 80% by weight of the amounts normally used in the baked product, a member of the class consisting of the edible high molecular weight esters of edible high molecular weight fatty acids and ethers corresponding to said esters, and an acid mucilaginous emulsifying agent, said member of the class having at least one unreacted hydroxyl group and being at least semi-solid at 25° C.

2. A dry mix for baked flour products comprising flour, a shortening agent comprising a fatty substance normally fluid above about 125° F., a member of the class consisting of the edible high molecular weight esters of edible high molecular weight fatty acids and ethers corresponding to said esters, and an acid mucilaginous emulsifying agent, said member of the class having at least one unreacted hydroxyl group and being at least semi-solid at 25° C., and emulsifying agent being present in an amount sufficient to form a heat resistant emulsion with water that is at least semi-plastic at temperatures up to about 210° F. so that the shortening value will be retained during baking.

3. The dry mix of claim 1 wherein the fat is present in from 15 to 40% by weight of the amounts of fat normally used in the baked product.

4. The dry mix of claim 1 wherein the member of said class of esters and ethers is present in from 4 to 12% by weight of the shortening.

5. The dry mix of claim 1 wherein the member of said class of esters and ethers is propylene glycol monostearate.

6. The dry mix of claim 1 wherein said fat is lard.

7. A dry mix for baked flour products containing flour and a shortening agent comprising a fat present in from 15 to 40% by weight of the amounts normally used and there being also present from 4 to 12% by weight of the shortening of propylene glycol monostearate and an acid mucilaginous emulsifying agent.

8. The dry mix of claim 7 wherein the emulsifying agent is algin.

9. The dry mix of claim 2 wherein said member is is propylene glycol monostearate.

10. A dry mix for baked flour products containing flour and a shortening agent comprising 0.3 to 3% of a member of the class consisting of the edible high molecular weight esters of edible high molecular weight fatty acids and ethers corresponding to said esters, said member of the class consisting of esters and ethers having at least one unreacted hydroxyl group and being at least semi-solid at about 25° C.; 0.015 to 8% of a humectant; 0.5 to 6% of a fat; and from 0.001 to 0.2 of an emulsifying agent, said percentages being by weight of said dry mix, and said shortening agent including the fat being present in an amount considerably less than the amount of fat alone that is ordinarily used.

11. The dry mix of claim 10 wherein said member of the class consisting of esters and ethers is glycerol monostearate.

12. The dry mix of claim 10 wherein said member of the class consisting of esters and ethers is propylene glycol monostearate.

13. The dry mix of claim 10 wherein the total of the fat and the member of the class consisting of esters and ethers does not exceed about 9% of said mix.

EDWARD B. JAEGER.

REFERENCES CITED

The following references are of record in the file of this patent:

UNITED STATES PATENTS

| Number | Name | Date |
| --- | --- | --- |
| 1,491,380 | Clark | Apr. 22, 1924 |
| 1,524,783 | Curtner | Feb. 3, 1925 |
| 1,831,728 | Working | Nov. 10, 1931 |
| 1,936,718 | Jordan | Nov. 28, 1933 |
| 2,009,440 | Epstein | July 30, 1935 |
| 2,062,782 | Epstein | Dec. 1, 1936 |
| 2,079,336 | Ralston | May 4, 1937 |
| 2,101,742 | Keyser | Oct. 17, 1937 |
| 2,123,880 | Coith et al. | July 19, 1938 |
| 2,132,395 | Coith et al. | Oct. 11, 1938 |
| 2,132,396 | Coith | Oct. 11, 1938 |
| 2,132,406 | Epstein | Oct. 11, 1938 |
| 2,132,416 | Harris | Oct. 11, 1938 |

(Other references on following page)

UNITED STATES PATENTS

| Number | Name | Date |
|---|---|---|
| 2,132,417 | Harris | Oct. 11, 1948 |
| 2,132,436 | Reynolds | Oct. 11, 1938 |
| 2,132,687 | Harris | Oct. 11, 1938 |
| 2,132,701 | Richardson | Oct. 11, 1938 |
| 2,508,393 | Jaeger | May 23, 1950 |

FOREIGN PATENTS

| Number | Country | Date |
|---|---|---|
| 326,742 | Great Britain | Mar. 20, 1930 |

OTHER REFERENCES

Special Report No. 15, Research Ass'n. of British Flour-Millers, Nov. 1936, pp. 15, 21, 25, 26, 27.

Gregory, Uses and Applications of Chemistry, Etc., Rheinhold Publishing Co., 1939, page 306.

Harris et al., "Fatty Interface Modifiers etc.," Oil and Soap, Sept. 1941, pp. 179 to 182.